(12) United States Patent
Nabar et al.

(10) Patent No.: US 7,872,962 B1
(45) Date of Patent: Jan. 18, 2011

(54) SYSTEM AND METHOD FOR PRODUCING WEIGHTED SIGNALS IN A DIVERSITY COMMUNICATION SYSTEM

(75) Inventors: Rohit Nabar, Sunnyvale, CA (US);
Kedar Shirali, Sunnyvale, CA (US);
Hui-Ling Lou, Palo Alto, CA (US);
Jungwon Lee, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 1236 days.

(21) Appl. No.: 11/447,762

(22) Filed: Jun. 5, 2006

Related U.S. Application Data

(60) Provisional application No. 60/727,679, filed on Oct. 18, 2005.

(51) Int. Cl.
*H04J 11/00* (2006.01)
(52) U.S. Cl. .................. 370/206; 370/324; 375/260; 375/299
(58) Field of Classification Search ............. 370/210, 370/252, 310, 321, 338–349, 147, 148, 206; 455/560–562.1; 375/147, 148, 340–344, 375/260, 267, 295, 299
See application file for complete search history.

(56) References Cited

U.S. PATENT DOCUMENTS

| | | | |
|---|---|---|---|
| 5,999,826 A * | 12/1999 | Whinnett | 455/561 |
| 6,666,823 B2 * | 12/2003 | Yao | 600/443 |
| 7,058,002 B1 * | 6/2006 | Kumagai et al. | 370/203 |
| 7,301,993 B2 * | 11/2007 | Ibrahim et al. | 375/152 |
| 7,336,597 B2 * | 2/2008 | Maltsev et al. | 370/206 |
| 2002/0041253 A1 * | 4/2002 | Ishii et al. | 342/383 |
| 2002/0187814 A1 * | 12/2002 | Yoshida | 455/562 |
| 2003/0128751 A1 * | 7/2003 | Vandenameele-Lepla | 375/229 |
| 2004/0174300 A1 * | 9/2004 | Nakagawa | 342/377 |
| 2004/0184515 A1 * | 9/2004 | Im | 375/148 |
| 2007/0189409 A1 * | 8/2007 | Hottinen | 375/267 |
| 2008/0150803 A1 * | 6/2008 | Ban | 342/383 |
| 2008/0261534 A1 * | 10/2008 | Wang et al. | 455/67.11 |

* cited by examiner

*Primary Examiner*—William Trost, IV
*Assistant Examiner*—Roberta A Shand

(57) ABSTRACT

The disclosed technology relates to a communication system and method in which multiple versions of a signal are processed to detect the signal. The communication system can include transmitters that communicate different versions of a signal to a receiver. The different versions are weighted versions of the signal and are communicated on different channels. The weight for a weighted signal is based on an inverse of an estimate of the phase shift of the particular channel to which the weighted signal will be communicated. The weights are also based on a unity gain such that each weighted signal has the same magnitude as the original signal. A receiver that receives the weighted signals processes the received signals to detect the original signal.

25 Claims, 10 Drawing Sheets

SYSTEM AND METHOD FOR PRODUCING WEIGHTED SIGNALS IN A DIVERSITY COMMUNICATION SYSTEM

CROSS-REFERENCE TO RELATED APPLICATIONS

This application claims the benefit under 35 U.S.C. §119 (e) of U.S. Provisional Application No. 60/727,679, filed Oct. 18, 2005, which is incorporated herein by reference in its entirety.

BACKGROUND OF THE INVENTION

This invention relates to communication systems and methods and, more particularly, to communication systems and methods in which multiple versions of a signal are processed to detect the signal.

In most communication systems, it is beneficial to understand how a communication signal changes as it progresses from a transmitter to a receiver. Conceptually, the cumulative variations that a communication signal experiences is characterized in the art as a "channel." The concept of a digital communications channel is well known. In particular, it is known that a channel can affect the amplitude and phase of a signal in the channel. As a simple example, suppose a signal $\cos(\omega_0 t')$ is communicated in a channel, where $w_0$ is the angular frequency of the signal, t' is the time associated with the transmission of the signal, and t'=0 represents the beginning of the transmission. Ideally, the signal that arrives at a receiver should have the same amplitude and phase; i.e., the received signal should be $\cos(\omega_0 t)$, where t is the time associated with receiving the signal, and t=0 represents the beginning of the reception. The time t=0 may correspond to t'=π, for some transmission delay π. However, the received signal is seldom the same as the transmitted signal, even in a noiseless environment. Rather, (in the absence of noise) a receiver will more likely receive a signal A $\cos(\omega_0 t+\phi)$, where A is a real number that shows the channel's effect on the amplitude of the signal, and φ is a real number that shows the channel's effect on the phase of the signal. The quantity φ is commonly referred to as "initial phase."

Although the example above shows a transmission signal that has only one frequency component $\omega=\omega_0$, a signal may include more than one frequency component. Additionally, a channel may affect each frequency component differently. Accordingly, the amplitude A and the initial phase φ in the example above may only apply to frequency component $\omega=\omega_0$. From this point on, when a signal includes more than one frequency component, the amplitude and initial phase for each frequency component $\omega=\omega_i$ will be denoted with a corresponding subscript i.

A fundamental concept of digital communications is that amplitude and initial phase can be represented by a coordinate in a Cartesian plane. For example, an amplitude A and an initial phase φ can be represented by the coordinate (x,y) where x=A cos(φ) and y=A sin(φ). Conversely, given a coordinate (x,y), an amplitude and initial phase can be computed by $A=\sqrt{x^2+y^2}$ and $$\phi = \arctan\left(\frac{y}{x}\right).$$

Another fundamental concept is that a coordinate (x,y) can also correspond to a complex number of the form (x+jy), where j is the imaginary unit. In this case, the x-axis represents the real part of a complex number, and the y-axis represents the imaginary part of a complex number. The benefits of representing amplitude and initial phase graphically as a coordinate point and mathematically as a complex number are that these representations allow changes in amplitude and initial phase to be easily illustrated and computed. The next paragraph shows an example of computing a channel's effects on a signal's amplitude and initial phase. In particular, an important computation involves Euler's formula, which states that a complex number (x+jy) can equivalently be expressed as $Ae^{j\phi}$, where e is the complex exponential, and, as shown above, $A=\sqrt{x^2+y^2}$ and $$\phi = \arctan\left(\frac{y}{x}\right),$$

X=A cos(φ) and y=A sin (φ).

As an example, suppose a transmitted signal in a channel has frequency components of the form $A_i \cos(\omega_i t+\phi_i)$. In the absence of noise, the channel will generally alter the amplitude multiplicatively by a factor $K_i$, and alter the initial phase additively by a factor $\theta_i$, resulting in a received frequency component of the form $K_i A_i \cos(\omega_i t+\phi_i+\theta_i)$. Representing these amplitudes and initial phases mathematically, the amplitude and initial phase of the transmitted frequency components can be characterized by $A_i e^{j\phi_i}$, and those of the received frequency component can be characterized by $K_i A_i e^{j(\phi_i+\theta_i)}=A_i e^{j\phi_i} K_i e^{j\theta_i}$. This shows two important things. First, it can be seen that the channel's effect on the amplitude and initial phase of the transmitted frequency component is captured by the term $K_i e^{j\theta_i}$. Second, if (in the absence of noise) the amplitude and initial phase of a received frequency component are $B_i e^{j\Phi_i}$, then the channel's effect on the transmitted amplitude and initial phase can be computed by $$K_i e^{j\theta_i} = \frac{B_i e^{j\varphi_i}}{A_i e^{j\varphi_i}} = \frac{B_i}{A_i} e^{j(\varphi_i-\phi_i)};$$

i.e., $$K_i = \frac{B_i}{A_i}$$

and $\theta_i=\phi_i-\phi_i$. When all of the effects $K_i e^{j\theta_i}$ across a continuous frequency range are quantified, the result is a function showing a channel's effect on signal amplitude and initial phase based on frequency. The function is referred to in the art as a "transfer function." A graph of a transfer function with respect to frequency is referred to as the channel's "frequency response."

It is known that a channel's frequency response can change over time. Therefore, the channel's frequency response may need to be estimated periodically in order to maintain a reasonably accurate estimate of the frequency response. In some situations, the changes may occur randomly and channel estimates may momentarily become inaccurate. One process that can supplement channel estimation in such situations is known in the art as "diversity." Diversity involves sending multiple versions of a communication signal to a receiver in multiple channels where, ideally, the channel estimate for at least one of the channels is reasonably accurate. To accomplish this, diversity requires the multiple channels to be substantially uncorrelated so that changing conditions in one channel do not also occur in another channel. A receiver can receive and process these different versions to detect the communication signal. In some cases, the receiver can simply select the version that has the highest signal energy to be the detected signal. In some cases, the receiver can combine the multiple versions in equal or unequal proportions to produce the detected signal.

Although diversity is beneficial, its implementation is also correspondingly more complex. In some situations, a communication system may not need the full benefit of diversity. For example, some communication systems may be able to tolerate more inaccuracy in the detected signal and may benefit more from a less complex implementation. Accordingly, there is continuing interest in further developing the technology of diversity communication and its implementation.

SUMMARY OF THE INVENTION

The disclosed technology provides a system and method for communicating a signal. In accordance with one aspect of the invention, the disclosed technology can provide a weighted signal based on a weight, and communicate the weighted signal to a channel. The disclosed technology can access a phase shift estimate for the channel and can compute the weight based on an inverse of the phase shift estimate and based on unity gain. Based on the unity gain, the weighted signal will have the same magnitude as the original signal. As used herein, a weight can refer to a complex number that is representative of a phase shift or an amplitude gain. It will be understood that "applying a weight" to a signal, as used herein, refers to configuring the signal's amplitude and phase based on the phase shift and amplitude gain represented by the weight. In one embodiment, a phase shift estimate and/or a weight can be computed at a transmitter or a receiver by using, for example, predetermined training signals. If the computation is performed at a receiver, the receiver can communicate the result of the computation to the transmitter.

In accordance with one aspect of the invention, the disclosed technology can provide a second weighted signal based on a second weight, and communicate the second weighted signal to a second channel that is distinct from the first channel. The disclosed technology can access a phase shift estimate for the second channel and can compute the weight based on an inverse of the phase shift estimate for the second channel and based on unity gain. Based on the unity gain, the second weighted signal will have the same magnitude as the original signal.

In accordance with one aspect of the invention, the disclosed technology can provide more than two weighted signals. Each of the weighted signals can be communicated on a separate channel. The weight applied to each signal can correspond to the inverse of the phase shift estimate of the channel on which the signal is communicated.

In accordance with one aspect of the invention, the disclosed technology can quantize a phase shift estimate to a particular bit precision. In accordance with one aspect of the invention, the disclosed technology can quantize a weight to a particular bit precision.

In one aspect of the invention, a weight for a signal can also be computed based on a phase shift factor. In this manner, the weight for each weighted signal can be based on the phase shift factor and the inverse of the phase shift estimate of the channel on which the weighted signal is communicated. In one embodiment, the phase shift factor can correspond to a phase shift estimate for a particular channel. For the particular channel, the weight of the weighted signal being communicated to that channel will be based on the phase shift estimate for the particular channel (i.e., the phase shift factor) and the inverse of the phase shift estimate for the particular channel. In this case, the weight can have a value of one, meaning that the weighted signal will have the same phase and amplitude as the original signal. On the other hand, if the weighted signal is not being communicated to the particular channel corresponding to the phase shift factor and is being communicated to another channel, then the weight can be based on an inverse of the phase shift estimate for the other channel and the phase shift estimate for the particular channel.

In accordance with one aspect of the invention, a diversity weighting circuit can provide a weighted signal based on a weight, and a communication circuit can communicate the weighted signal to a channel. A channel estimation circuit can access a phase shift estimate for the channel, and the diversity weighting circuit can compute the weight based on an inverse of the phase shift estimate and based on unity gain. Based on the unity gain, the weighted signal will have the same magnitude as the original signal. In one embodiment, a channel estimation circuit at a transmitter or a channel estimation circuit at a receiver can compute a phase shift estimate and/or a weight by using, for example, predetermined training signals. If the computation is performed by a channel estimation circuit at a receiver, the receiver can communicate the result of the computation to the transmitter.

In accordance with one aspect of the invention, a second diversity weighting circuit can provide a second weighted signal based on a second weight, and a second communication circuit can communicate the second weighted signal to a second channel that is distinct from the first channel. A second channel estimation circuit can access a phase shift estimate for the second channel, and the second diversity weighting circuit can compute the weight based on an inverse of the phase shift estimate for the second channel and based on unity gain. Based on the unity gain, the second weighted signal will have the same magnitude as the original signal.

In accordance with one aspect of the invention, the disclosed technology can include more than two diversity weighting circuits and more than two communication circuits. Each communication circuit can communicate a weighted signal to a separate channel, and each diversity weighting circuit can produce the weight for the weighted signal based on the inverse of the phase shift estimate for the channel.

In accordance with one aspect of the invention, the channel estimation circuit can include circuitry that quantizes a phase shift estimate to a particular bit precision. In accordance with one aspect of the invention, the diversity weighting circuit can quantize a weight to a particular bit precision.

In one aspect of the invention, a diversity weighting circuit can also compute a weight for a signal based on a phase shift factor. In this manner, the weight for each weighted signal can be based on the phase shift factor and the inverse of the phase shift estimate for the channel on which the weighted signal is communicated. In one embodiment, the phase shift factor can correspond to a phase shift estimate for a particular channel. For the particular channel, the weight of the weighted signal being communicated to that channel will be based on the phase shift estimate for the particular channel (i.e., the phase shift factor) and the inverse of the phase shift estimate for the particular channel. In this case, the weight can have a value of one, which means that the weighted signal will have the same phase and amplitude as the original signal. On the other hand, if the weighted signal is not being communicated to the particular channel corresponding to the phase shift factor and is being communicated to another channel, then a diversity weighting circuit can compute the weight for that signal based on an inverse of the phase shift estimate for the other channel and the phase shift estimate for the particular channel.

In accordance with one aspect of the invention, the disclosed technology can include a computer program running on a processor that provides a weight, which can be used to provide a weighted signal that can be communicated in a channel. The computer program can access a phase shift estimate for the channel and can compute the weight based on an inverse of the phase shift estimate and based on unity gain. Based on the unity gain, the weighted signal will have the same magnitude as the original signal. In one embodiment, a channel estimation computer program at a transmitter or a channel estimation computer program at a receiver can compute a phase shift estimate and/or a weight by using, for example, predetermined training signals. If the computation is performed by a channel estimation computer program at a receiver, the receiver can communicate the result of the computation to the transmitter.

In accordance with one aspect of the invention, the disclosed technology can include a second computer program running on a second processor for providing a second weight that can be used to provide a second weighted signal that can be communicated on a second channel. The second computer program can access a phase shift estimate for the second channel and can compute the second weight based on an inverse of the phase shift estimate for the second channel and based on unity gain. Based on the unity gain, the second weighted signal will have the same magnitude as the original signal.

In accordance with one aspect of the invention, the disclosed technology can include more than two computer programs running on separate processors for providing weights, which can be used to provide weighted signals that can be communicated on separate channels. Each computer program can access a phase shift estimate for its corresponding channel and can compute a weight based on an inverse of the phase shift estimate for the channel and based on unity gain. Based on the unity gain, the weighted signal will have the same magnitude as the original signal.

In accordance with one aspect of the invention, the computer programs can quantize the phase shift estimates for the channels to a particular bit precision. In accordance with one aspect of the invention, the computer programs can quantize a weight to a particular bit precision.

In one aspect of the invention, a computer program can also compute a weight for a signal based on a phase shift factor. In this manner, the weight for each weighted signal can be based on the phase shift factor and the inverse of the phase shift estimate of the channel on which the weighted signal is communicated. In one embodiment, the phase shift factor can correspond to the inverse of a phase shift estimate for a particular channel. For the particular channel, the weighted signal being communicated to that channel will be based on the phase shift estimate for the particular channel (i.e., the phase shift factor) and the inverse of the phase shift estimate for the particular channel. In this case, the weight can have a value of one, meaning that the weighted signal will have the same phase and amplitude as the original signal. On the other hand, if the weighted signal is not being communicated to the particular channel corresponding to the phase shift factor and is being communicated to another channel, then a computer program can compute the weight for that signal based on an inverse of the phase shift estimate for the other channel and the phase shift estimate for the particular channel.

Further features of the invention, its nature and various advantages, will be more apparent from the accompanying drawings and the following detailed description of the various embodiments.

DETAILED DESCRIPTION

The disclosed technology provides a communication system and method in which multiple versions of a signal are processed to detect the signal. In particular, the disclosed technology is based on diversity, in which multiple versions of a communication signal are communicated to a receiver in different channels. It will become clear from the following description that the disclosed technology can generally apply to systems in which different channels can be configured to be substantially uncorrelated.

Figure 1:
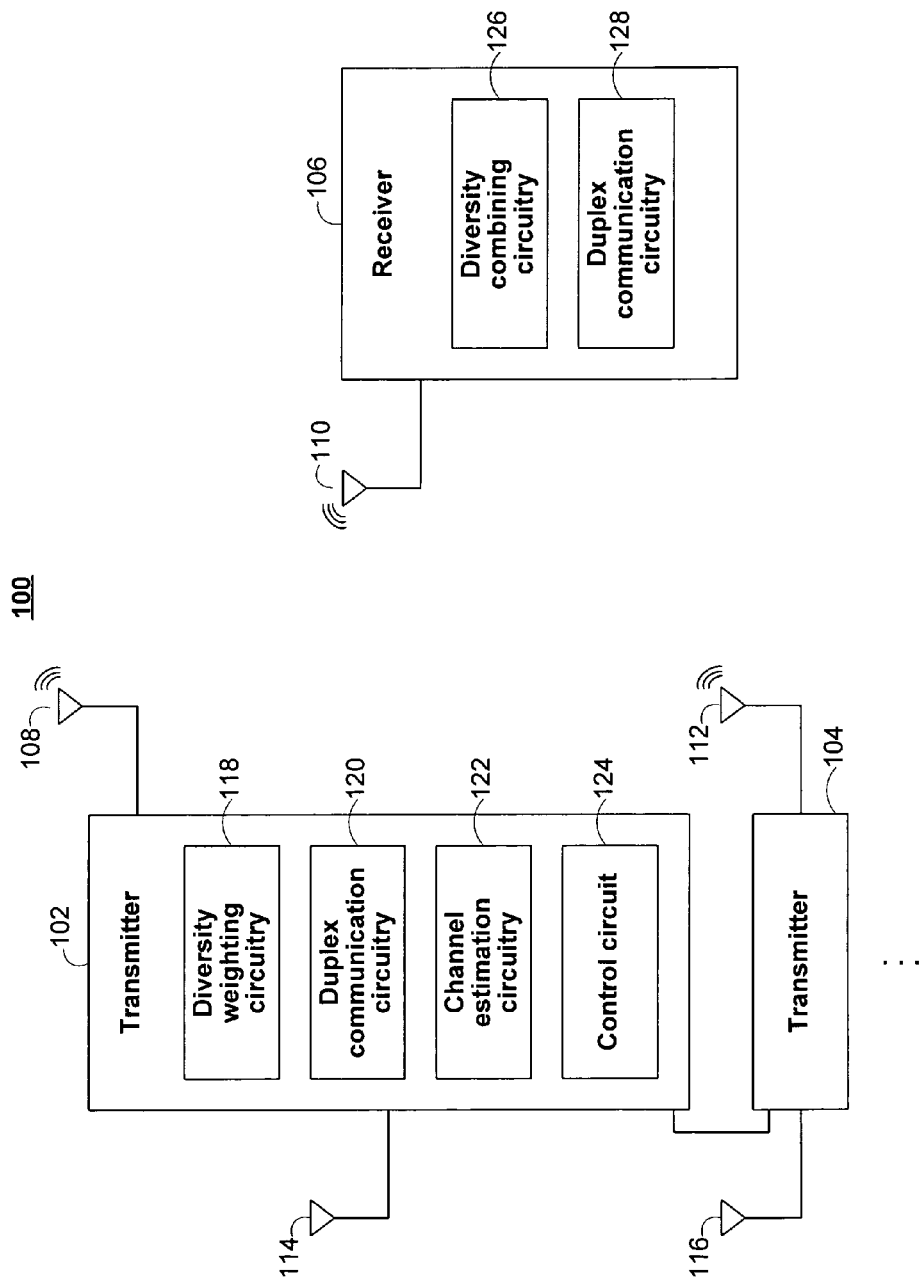
FIG. 1 is a block diagram of an exemplary communication system in accordance with aspects of the invention.

Referring now to FIG. 1, there is shown a block diagram of an exemplary communication system 100 in accordance with aspects of the invention. The illustrated system 100 includes two transmitters 102, 104 and a receiver 106. The components of the first transmitter 102 and the components of the receiver 106 are shown. The components of the second transmitter 104 are not shown to simplify the illustration, but they can correspond to the same components as the first transmitter 102. The components of the transmitters 102, 104 and the receiver 106 can be implemented using hardware, computer programs running on a processor, or some combination thereof. In certain embodiments, the communication system 100 can include more than two transmitters and can include more than one receiver. Such a system is known in the art as a multiple-input multiple-output (MIMO) system. In certain embodiments, the communication system 100 can include one transmitter and one receiver. Such a system is known in the art as a single-input single-output (SISO) system. It is contemplated that aspects of the disclosed invention can apply to MIMO and SISO communication systems, and this will become clear by the description below.

With continuing reference to FIG. 1, the transmitters 102, 104 can communicate with the receiver 106 wirelessly using antennae 108-112. The wireless paths between the transmitters 102, 104 and the receiver 106 may include multipath effects, such as fading. In certain embodiments, the transmitters 102, 104 can, additionally or alternatively, communicate with the receiver 106 using a physical communication path (not shown). A physical path may include one or more communication media or devices (e.g., wires, cables, optical fiber, repeater devices). It is contemplated that aspects of the invention apply to physical communication media as well.

As described above, diversity involves sending multiple versions of a communication signal to the receiver 106 in multiple channels. In the illustrated embodiment, the communication path from the top transmitter antenna 108 to the receiver antenna 110 can correspond to one channel, and the communication path from the bottom transmitter antenna 112 to the receiver antenna 110 can correspond to another channel. To accomplish diversity, these channels can be substantially uncorrelated so that changing conditions in one channel occur only minimally in the other channel. In one embodiment, separating the physical locations of the transmitter antennae 108, 112 can be one way to configure the top and bottom transmitter channels to be substantially uncorrelated.

As described above, it is contemplated that the disclosed invention will apply to MIMO and SISO systems. This is possible because even in such systems, there may be multiple channels that can be configured to be substantially uncorrelated. In a MIMO system, any particular receiver can be configured to communicate with more than one transmitter. In this case, the illustrated embodiment of FIG. 1 can correspond to a portion of a MIMO system. In a SISO system, a single transmitter may, for example, communicate using time division multiplexing (TDM) technology, in which different time slots correspond to different "channels." In a TDM system, two channels may be uncorrelated under certain circumstances if they are separated far enough apart in time. In a SISO system, a transmitter may also communicate, for example, using frequency division multiplexing (FDM), in which different frequency bands correspond to different "channels." In a FDM system, two channels may be uncorrelated under certain circumstances if they are separated far enough in frequency. TDM and/or FDM technology can also be applied in a MIMO system and in the illustrated communication system 100 of FIG. 1.

As described above, a diversity communication system 100 involves communicating multiple versions of a signal to a receiver 106, which can receive and process these different versions to detect the communication signal. In the illustrated embodiment of FIG. 1, the top transmitter 102 includes a diversity weighting circuit 118 that can provide a weighted version of a communication signal (not shown). Similarly, the bottom transmitter 104 also includes a diversity weighting circuit that can provide a weighted version of the communication signal. As used herein, a weight can refer to a complex number that is representative of a phase shift or an amplitude gain. It will be understood that "applying a weight" to a signal, as used herein, refers to configuring the signal's amplitude and phase based on the phase shift and amplitude gain represented by the weight. A communication circuit 120 in the top transmitter 102 and a communication circuit in the bottom transmitter 104 can communicate these weighted signals (not shown) via their respective antennae 108, 112. As described above, the signals that arrive at the receiver 106 will not be the same as the weighted signals because of channel effects and other phenomena, such as noise. For clarity, the altered signals that arrive at the receiver will be referred to as "received signals."

The receiver 106 includes a diversity combining circuit 126 that can receive and process the received signals to, for example, mitigate multipath effects and recover the communicated signal. The diversity combining circuit 126 can operate based on various diversity techniques that are known in the art. For example, in one embodiment, the diversity combining circuit 126 can measure the energy levels of the received signals and can select one or more signals having the highest energy levels. In one embodiment, the diversity combining circuit 126 can select all or a subset of signals whose energy levels are greater than a threshold level. In one embodiment, the diversity combining circuit 126 can select a particular channel from which to receive signals and can continue to use the selected channel until the signal energy level on the channel drops below a threshold. In one embodiment, the diversity combining circuit 126 can adjust the received signals to align their phases and can scale and sum at least some of the phase-aligned signals to provide a summed signal. In this embodiment, the phase alignment operation is commonly referred to in the art as "co-phasing." The diversity combining circuitry 126 of the receiver 106 can operated based on one or more of these techniques.

As described above, the diversity weighting circuit 118 of the transmitter 102 provides a weighted signal (not shown). In accordance with one aspect of the invention, the diversity weighting circuit 118 uses a weight that is based on the phase effect of the channel from the transmitter 102 to the receiver 106 and based on unity gain. In other words, if a particular communication signal has an amplitude A and a phase $\theta$ before a weight is applied, the effect of applying the weight to the communication signal should only adjust the phase $\theta$ of the communication signal. The amplitude of the weighted signal should be substantially the same as the amplitude A of the original communication signal.

In one embodiment, the weight applied by the diversity weighting circuit 118 can be the inverse of the phase effect of the channel from the transmitter 102 to the receiver 106. For example, if the channel has a phase shift effect of $\phi$, the value of the weight in terms of complex number notation would b $e^{j(-\phi)} = \cos(\phi) - j \sin(\phi)$.

This weight provides computational and power-saving benefits for a diversity communication system. With respect to the computational benefit, it can be seen that the weight $e^{j(-\phi)}$ has only a phase shift component and adjusts only the phase of the communication signal. Because the phase adjustment is (ideally) the inverse of the phase effect of the channel, the diversity weighting circuit 118 essentially pre-compensates the communication signal so that co-phasing may not need to be performed by the receiver 106. In a communication system 100 that includes multiple transmitters 102, 104, the transmitters can each perform their weighting operations, which may be computationally more efficient than having the receiver 106 perform co-phasing on all of the received signals. The diversity combining circuit 126 in the receiver 106 can still perform operations other than co-phasing, as described above, such as scaling and summing at least some of the received signals to provide a summed signal. With respect to the power benefit, it can be seen that the weight $e^{j(-\phi)}$ has no amplitude gain. Therefore, the weighted signals at the different transmitters 102, 104 should have the same amplitude and the same energy because the weight does not change the amplitude of the original communication signal. Therefore, this weight simplifies the power circuitry (not shown) in the transmitters 102, 104 because they will not need to provide a wide range of power levels.

In accordance with one aspect of the invention, the channel phase shift estimate used by the diversity weighting circuit 118 can be provided by a channel estimation circuit 122 in the transmitter. The channel estimation circuit 122 provides the channel phase estimate for the channel from the transmitter 108 to the receiver 106. For clarity, this channel will be referred to as the "forward channel" from this point on. Those skilled in the art will recognize that the channel estimation circuit 122 will need information from the receiver 106 to perform the channel estimation. Therefore, the receiver 106 will need to be able to communicate information to the transmitter 102. In one embodiment, the receiver 106 can communicate with the transmitter 102 on a channel that is different from the forward channel. This channel will be referred to herein as a "reverse channel." The reverse channel may be a different frequency band (if FDM technology is used) and/or a different time slot (if TDM technology is used). The transmitter 102 and the receiver 106 each includes a duplex communication circuit 120, 128 that allows them to communicate on the forward and reverse channels.

In one embodiment, the reverse channel can be configured to be correlated to the forward channel, so that frequency response changes on the forward channel can also appear on the reverse channel. If TDM is used, the forward and reverse channels may be adjacent time slots. IF FDM is used, the forward and reverse channels may be adjacent frequencies. In this embodiment, the receiver 106 can communicate a predetermined training signal to the transmitter 102. Based on knowing the predetermined training signal, the transmitter 102 can estimate the phase shift effect of the reverse channel. Because the reverse channel is correlated with the forward channel, the phase shift estimate for the reverse channel can also be used as the phase shift estimate for the forward channel.

In one aspect of the invention, the reverse channel may not be correlated with the forward channel. In this embodiment, the phase shift estimate for the forward channel can be computed by the receiver and then communicated to the transmitter. The receiver can include a channel estimation circuit (not shown) that can estimate the phase effect of the forward channel based on, for example, a predetermined training signal. Using the reverse channel, the receiver 106 can communicate this estimate to the transmitter 102. In this embodiment, the channel estimation circuit 122 of the transmitter 102 may only need to store the phase effect estimate provided by the receiver 106.

In one aspect of the invention, the estimate of the phase shift effect of the forward channel can be a digital measurement that is quantized to a particular bit precision. A greater number of bits and quantization levels will allow the phase shift estimate for the forward channel to be more accurate. In one embodiment, the number of bits for the phase shift estimate can be limited to a number of bits b, which allows the quantization operation in the channel estimation circuit 122 to set the phase shift estimate to one of $2^b$ values. In one aspect of the invention, the weight used by the diversity weighting circuitry 118 for weighing a signal can also be a digital value that has a particular bit precision. The bit precision of a weight may or may not be the same as the bit precision of a forward channel's phase effect estimate. The weight can be set to the binary value that most closely represents the inverse of the forward channel's phase effect.

Figure 2:
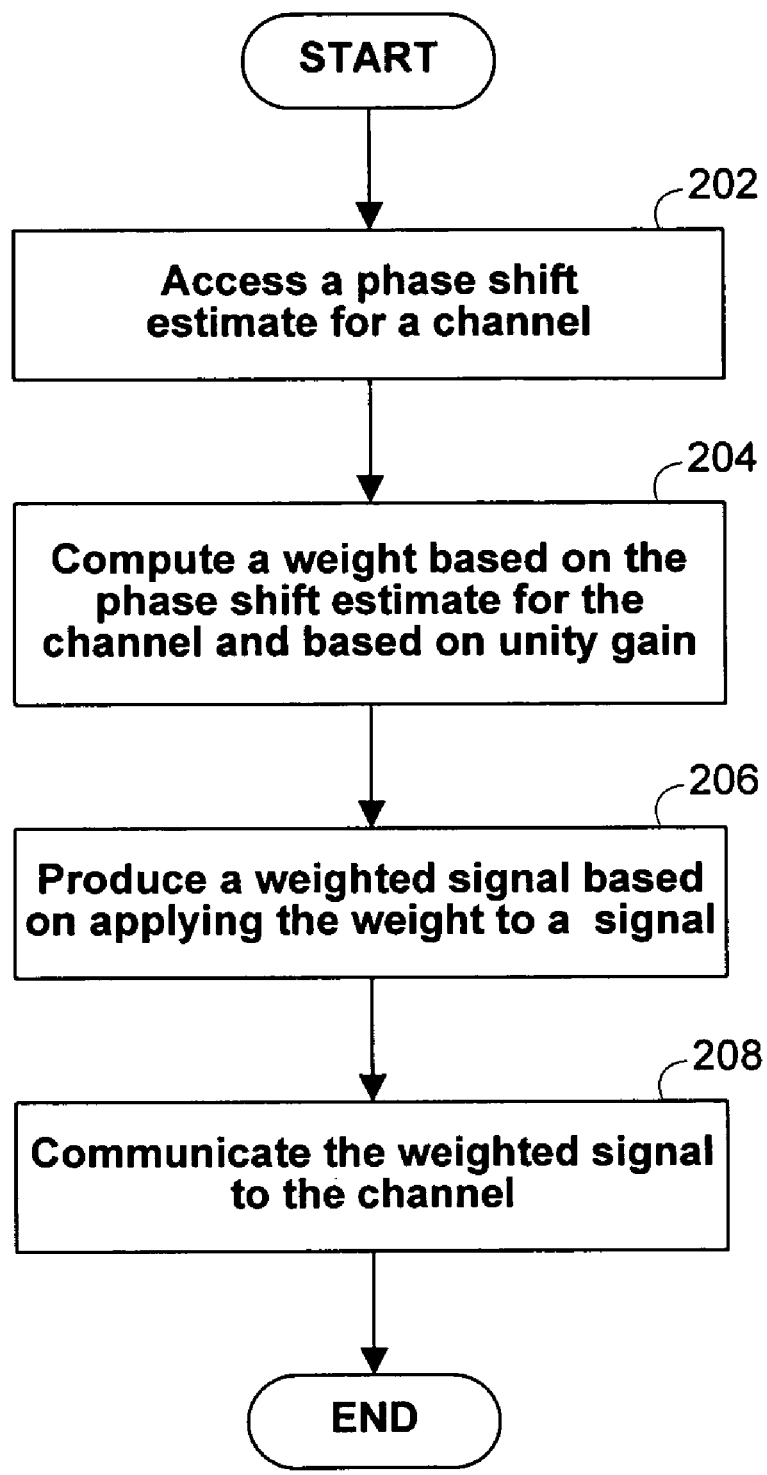
FIG. 2 is a flow diagram of an exemplary diversity communication operation in accordance with one aspect of the invention.

Accordingly, what have been described thus far are a method and a communication system in which multiple versions of a communication signal can be produced and communicated to a receiver. The receiver can receive and process the different versions to detect the original communication signal. As described above, the different versions can be weighted signals. FIG. 2 shows an exemplary flow chart of a transmitter operation for providing a weighted signal. A diversity weighting circuit in the transmitter can access a phase shift estimate for the forward channel from the channel estimation circuit 202. The diversity weighting circuit can compute a weight based on the phase shift estimate and based on unity gain 204. In one embodiment, the weight can be an inverse of the phase shift estimate. The diversity weighting circuit can produce a weighted signal based on applying the weight to a communication signal 206. Those skilled in the art will recognize that this can be accomplished in various ways. The communication circuit can be in communication with the diversity weighting circuit and can communicate the weighted signal via the antenna.

Referring again to FIG. 1, and in accordance with one aspect of the invention, the weight used by the diversity weighting circuit 118 can be based on a phase shift estimate for a forward channel as well as a phase shift factor (not shown), which may or may not be different from the phase shift estimate for the forward channel. In complex number notation, a weight in accordance with this aspect of the invention becomes $e^{j(-\phi)}e^{j\Phi}=e^{j(-\phi+\Phi)}$, where $-\phi$ is the inverse of the phase shift estimate for the forward channel, and $\Phi$ is the phase shift factor. The weight $e^{j(-\phi+\Phi)}$ will have a value of one when $-\phi+\Phi=0$, which represents unity gain and no phase shift. In accordance with one aspect of the invention, a common phase shift factor can be used in each transmitter circuit 102, 104. Because the same phase shift factor is applied to the weight in each transmitter 102, 104, the weighted signals should still be aligned in phase when they arrive at the receiver 106. Therefore, the receiver 106 may not need to perform co-phasing on the received signals, although the diversity combining circuit can still perform its other operations, as described above, such as scaling and summing at least some of the received signals to provide a summed signal. In one embodiment, the phase shift factor can also be quantized to a particular bit precision.

Figure 3:
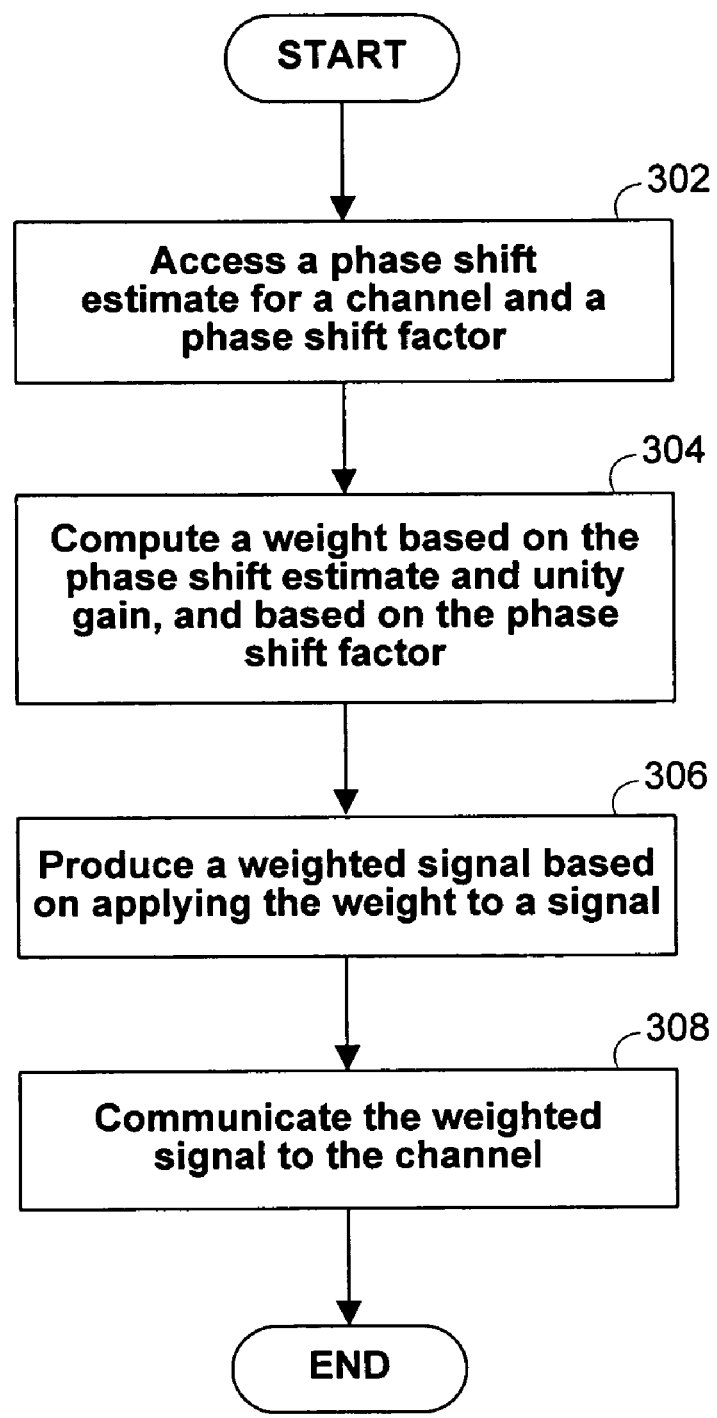
FIG. 3 is a flow diagram of another exemplary diversity communication operation in accordance with one aspect of the invention.

FIG. 3 shows a flow diagram of one embodiment of a transmitter operation for providing a weighted signal based on a phase shift estimate for a forward channel and a phase shift factor. A diversity weighting circuit in the transmitter can access a phase shift estimate for the forward channel and a phase shift factor from the channel estimation circuit 302. The diversity weighting circuit can compute a weight based on the inverse of the phase shift estimate of the forward channel, unity gain, and the phase shift factor 304. The diversity weighting circuit can produce a weighted signal based on applying the weight to a communication signal 306. The communication circuit can be in communication with the diversity weighting circuit and can communicate the weighted signal via the transmitter's antenna 308.

Referring again to FIG. 1, and in one aspect of the invention, the value of the phase shift factor can be configured to be the phase shift estimate for a particular forward channel. For example, suppose the channel estimation circuit 122 for the top transmitter 102 has a phase shift estimate of $\phi_{f1}$ for its forward channel, and the channel estimation circuit for the bottom transmitter 104 has a phase shift estimate of $\phi_{f2}$ for its forward channel. In one embodiment, the phase shift factor can be configured to be the phase shift estimate in the top transmitter, $\Phi=\phi_{f1}$. In this case, the weight used by the top transmitter's diversity weighting circuit 118 is $e^{j(-\phi_{f1}+\Phi)}=e^{j(-\phi_{f1}+\phi_{f1})}=1$, and the weight used by the bottom transmitter's diversity weighting circuit is $e^{j(-\phi_{f2}+\Phi)}=e^{j(-\phi_{f2}+\phi_{f1})}$. Accordingly, in this embodiment, the transmitter forward channel that corresponds to the phase shift factor will use a weight of one when producing the weighted signal, thereby producing no phase shift or amplitude adjustment. However, the transmitters whose forward channels do not correspond to the phase shift factor will have a weight that is different from one, i.e., the weight will represent a phase shift.

Figure 4:
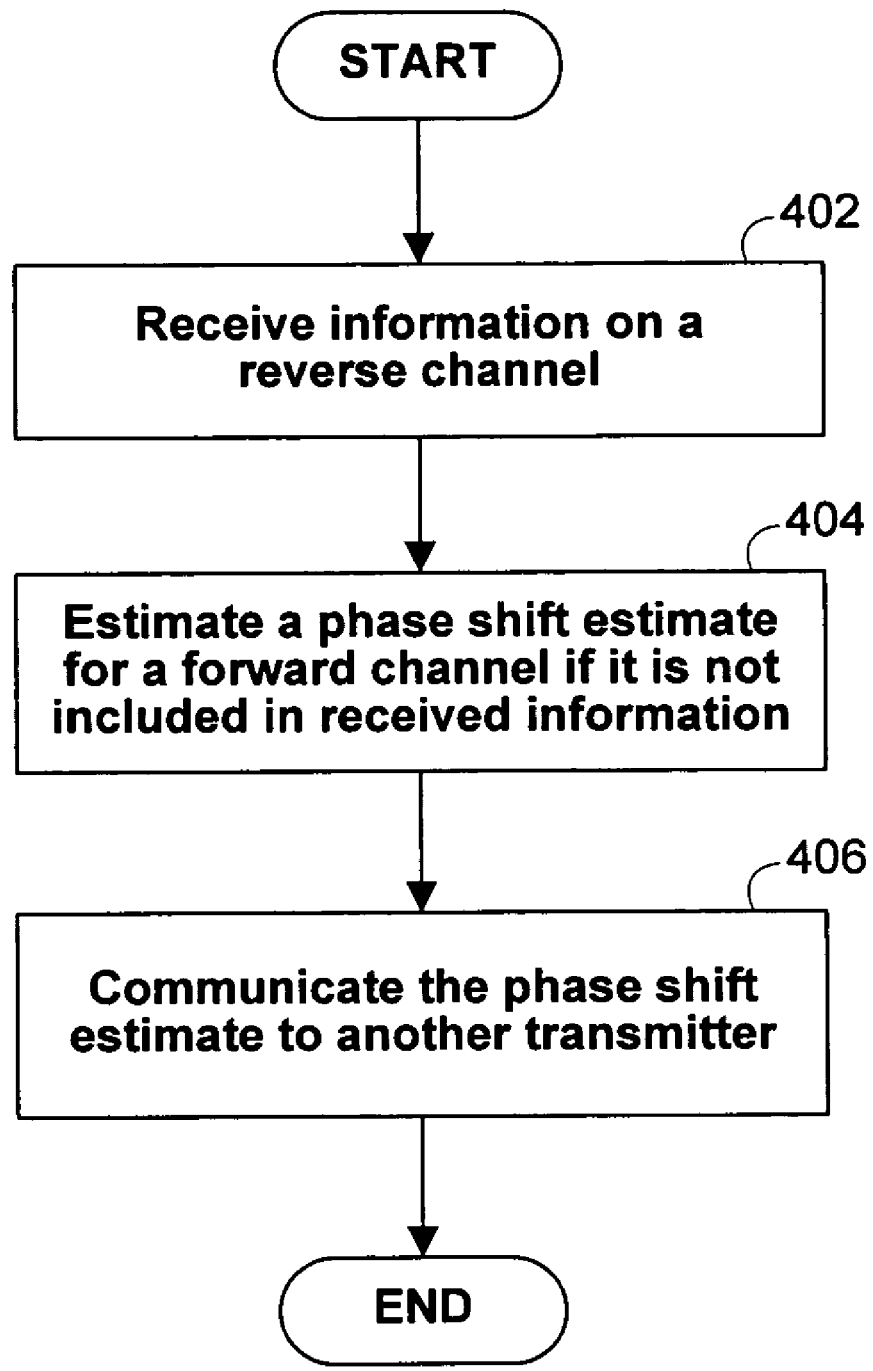
FIG. 4 is a flow diagram of an exemplary control circuit operation in accordance with one aspect of the invention.

Referring again to FIG. 1, the transmitter 102 includes a control circuit 124. In accordance with one aspect of the invention, the control circuit 124 can be in communication with the diversity weighting circuit 118, the duplex communication circuit 120, and the channel estimation circuit 122, and can control their operation. With reference also to FIG. 4, when the communication circuit receives information on the reverse channel 402, the control circuit can determine if the received information contains a phase shift estimate for the forward channel. If the received information does not contain a phase shift estimate, the control circuit can instruct the diversity communication system to produce a phase shift estimate 404 by, for example, directing the transmitter and/or the receiver to communicate predetermined training signals and to compute a phase shift estimate based on the training signals. Additionally, the control circuit can instruct the communication circuit to communicate the phase shift estimate to another transmitter 406 for use as a phase shift factor or for use in channel interpolation, for example. In one embodiment, the phase shift estimate for a particular transmitter can be the phase shift factor and can be communicated to each transmitter. In one embodiment, even when the phase shift estimate for a particular transmitter is not the phase shift factor, the phase shift estimate can still be communicated to other transmitters for use in channel interpolation. For example, in one embodiment, even though the different forward channels should be uncorrelated, a transmitter can nevertheless interpolate the phase shift estimate for its forward channel using the phase shift estimates for its neighboring forward channels. In TDM technology, neighboring forward channel can be the forward channels that have the closest time slots. In FDM technology, neighboring forward channels can be the forward channels that have the closest frequencies.

Figure 6:
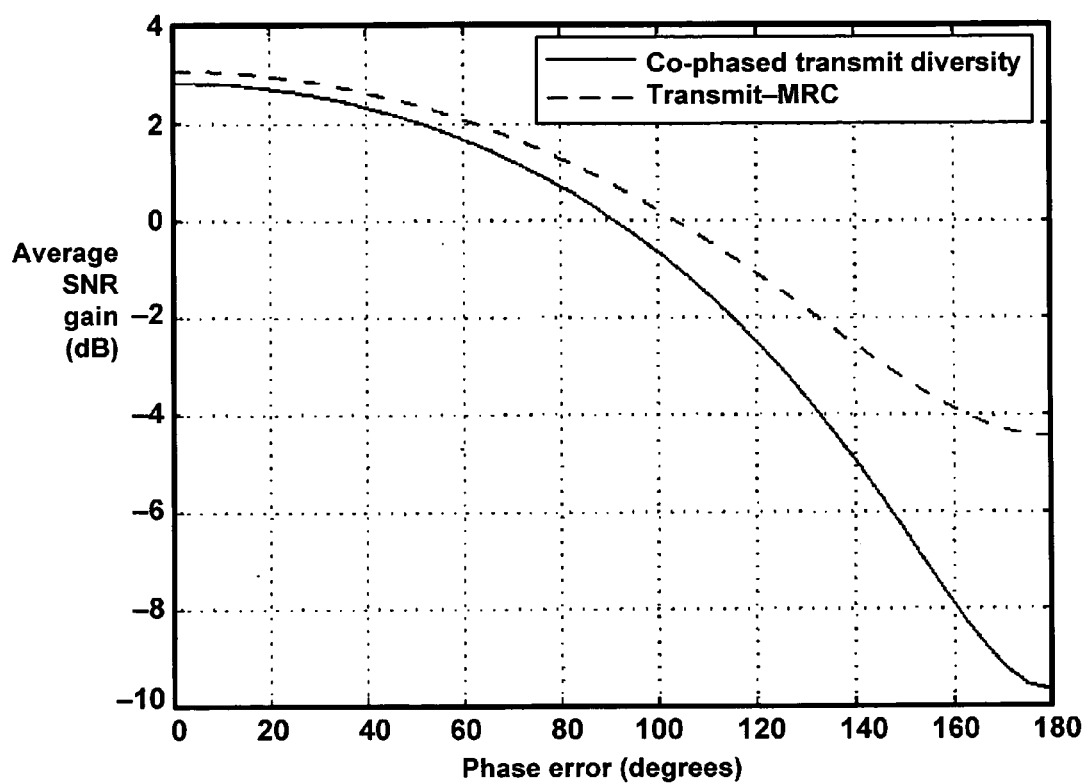
FIG. 6 is a graph of average SNR gain at a receiver versus phase error for two different diversity communication systems.

The following description relates to various considerations in the disclosed diversity communication system. Referring again to FIG. 1, it is possible that the phase shift estimate for a forward channel may not match the true phase shift of the forward channel. This difference can arise when the reverse channel is used in connection with estimating the phase effect of the forward channel. For example, a channel estimation circuit at the transmitter may be using the phase shift estimate of the reverse channel as the phase shift estimate of the forward channel, but the forward and reverse channels may not be perfect correlated. In another example, a transmitter or receiver can include radio-frequency (RF) chains for communicating on the forward and reverse channels. The RF chains include most of the non-baseband processing in a communication system, including a local oscillator, amplifier, and other components. A RF chain has a phase response that can be based on the placement of these components on a board, coupling effects, and other effects. A RF chain for a forward channel may have a different phase response than an RF chain for a reverse channel. When the reverse channel is used in connection with estimating a phase shift for the forward channel, the difference in phase response between the forward and reverse RF chains can give rise to an error in the phase shift estimate for the forward channel. This phase error is undesirable because the average signal-to-noise ratio (SNR) gain at the receiver degrades with increasing phase error. However, a communication system in accordance with the disclosed technology may be able to tolerate a limited amount of phase error. FIG. 6 shows a graph of the performance of a two-transmitter diversity communication system in accordance with the disclosed technology (labeled as "co-phased transmit diversity") in comparison with the performance of a communication system using maximum ratio combining at the transmitter (labeled as "transmit-MRC"). Although the graph shows the co-phased transmit diversity system performing slightly worse than the transmit-MRC system, the performance curves stay relatively close up to about 60° of phase error.

In one aspect of the invention, a diversity communication system in accordance with the present invention can be configured so that differences in the phase responses of a forward channel and its corresponding reverse channel become inconsequential. In particular, as long as the received signals at the receiver will be co-phased, the diversity combining circuit in the receiver can mitigate fading by, for example, scaling and summing the received signals. For example, referring again to FIG. 1, the top transmitter 102 and the receiver 106 can be in communication by way of a forward channel and a reverse channel, which can have phase shifts $\phi_{f1}$ and $\phi_{r1}$, respectively. Similarly, the bottom transmitter 104 and the receiver 106 can be in communication by way of another forward channel and another reverse channel, which can have phase shifts $\phi_{f2}$ and $\phi_{r2}$, respectively. As long as the difference between the phase responses of the forward and reverse channels for each transmitter 102, 104 are the same (i.e., $\phi_{f1}-\phi_{r1}=K$ and $\phi_{f2}-\phi_{r2}=K$), the received signals at the receiver 106 should be co-phased if they are each weighed based on the inverse of the phase shift estimate for their respective forward channels, as described above herein.

If there are more than two transmitters, then the difference between the phase responses of the forward and reverse channels for each transmitter can be configured to be the same, so that the received signals at the receiver can be co-phased. That is, each transmitter i can be configured so that the condition $\phi_{fi}-\phi_{ri}=K$ is satisfied. In one embodiment, this difference can be achieved for each transmitter by carefully designing and laying out the forward and reverse RF chains on a chip. In another embodiment, this difference can be achieved for each transmitter by estimating the phase difference and then introducing appropriate phase changes in the forward or reverse RF chains to achieve the desired phase difference.

Referring now to FIGS. 5A-5E, various exemplary implementations of the present invention are shown.

Figure 5A:
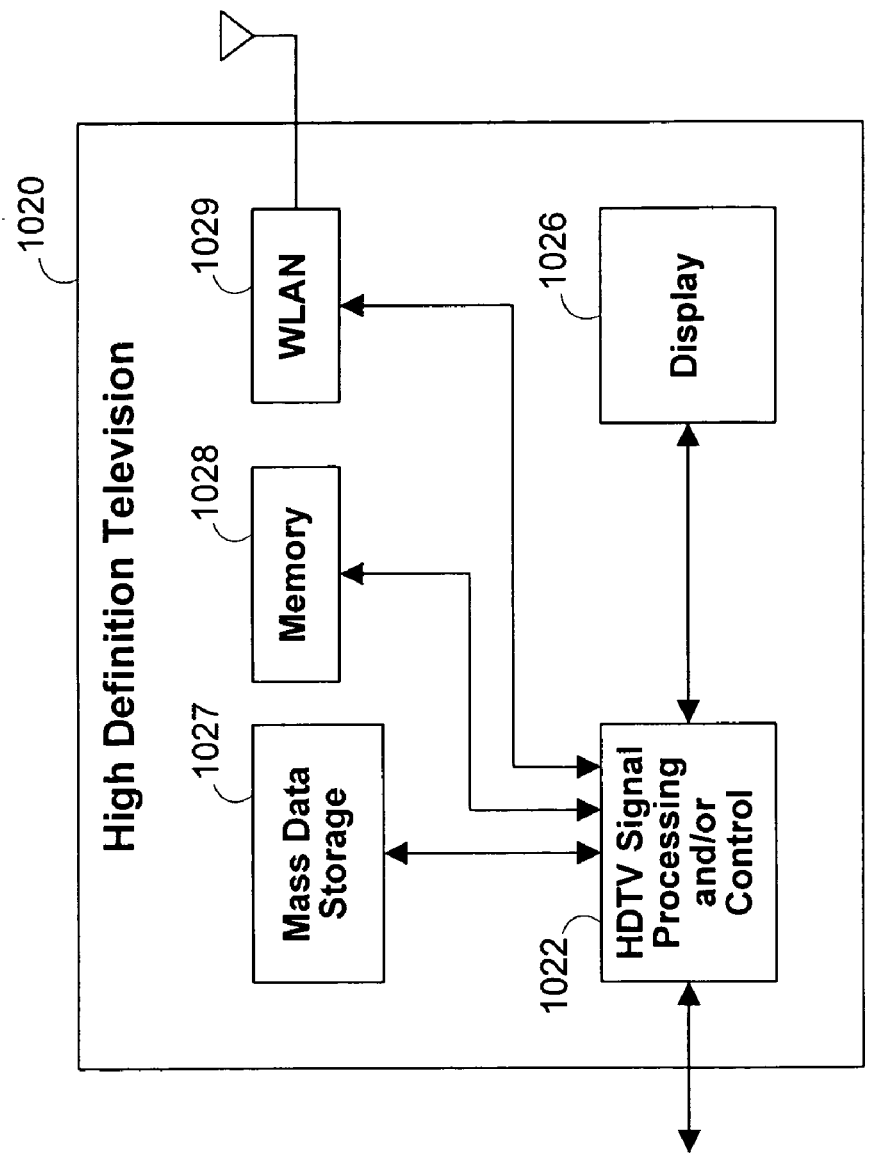
FIG. 5A is a block diagram of an exemplary high definition television that can employ the disclosed technology.

Referring now to FIG. 5A, the present invention can be implemented in a high definition television (HDTV) 1020. The present invention may implement either or both signal processing and/or control circuits, which are generally identified in FIG. 5A at 1022, a WLAN interface and/or mass data storage of the HDTV 1020. The HDTV 1020 receives HDTV input signals in either a wired or wireless format and generates HDTV output signals for a display 1026. In some implementations, signal processing circuit and/or control circuit 1022 and/or other circuits (not shown) of the HDTV 1020 may process data, perform coding and/or encryption, perform calculations, format data and/or perform any other type of HDTV processing that may be required.

The HDTV 1020 may communicate with mass data storage 1027 that stores data in a nonvolatile manner such as optical and/or magnetic storage devices. The HDD may be a mini HDD that includes one or more platters having a diameter that is smaller than approximately 1.8". The HDTV 1020 may be connected to memory 1028 such as RAM, ROM, low latency nonvolatile memory such as flash memory and/or other suitable electronic data storage. The HDTV 1020 also may support connections with a WLAN via a WLAN network interface 1029.

Figure 5B:
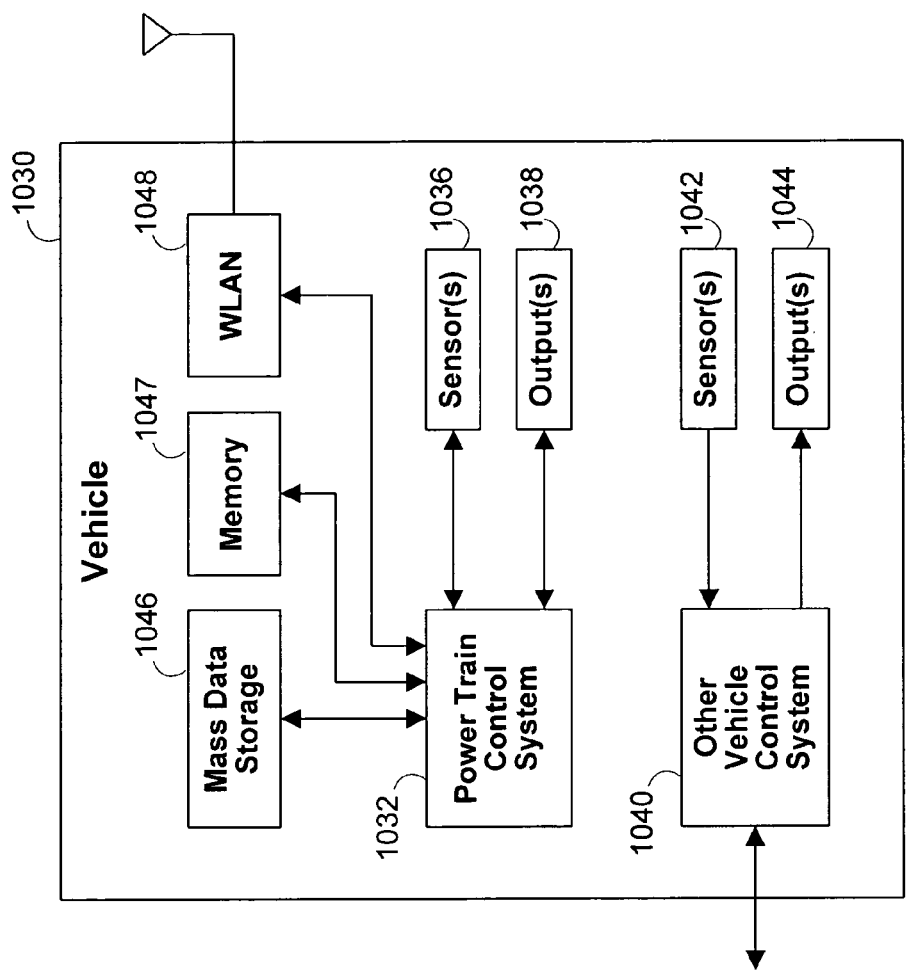
FIG. 5B is a block diagram of an exemplary vehicle that can employ the disclosed technology.

Referring now to FIG. 5B, the present invention implements a control system of a vehicle 1030, a WLAN interface and/or mass data storage of the vehicle control system. In some implementations, the present invention may implement a powertrain control system 1032 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 1040 of the vehicle 1030. The control system 1040 may likewise receive signals from input sensors 1042 and/or output control signals to one or more output devices 1044. In some implementations, the control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1032 may communicate with mass data storage 1046 that stores data in a nonvolatile manner. The mass data storage 1046 may include optical and/or magnetic storage devices for example hard disk drives HDD and/or DVDs. The HDD may be a mini HDD that includes one or more platters having a diameter that is smaller than approximately 1.8". The powertrain control system 1032 may be connected to memory 1047 such as RAM, ROM, low latency nonvolatile memory such as flash memory and/or other suitable electronic data storage. The powertrain control system 1032 also may support connections with a WLAN via a WLAN network interface 1048. The control system 1040 may also include mass data storage, memory and/or a WLAN interface (all not shown).

Figure 5C:
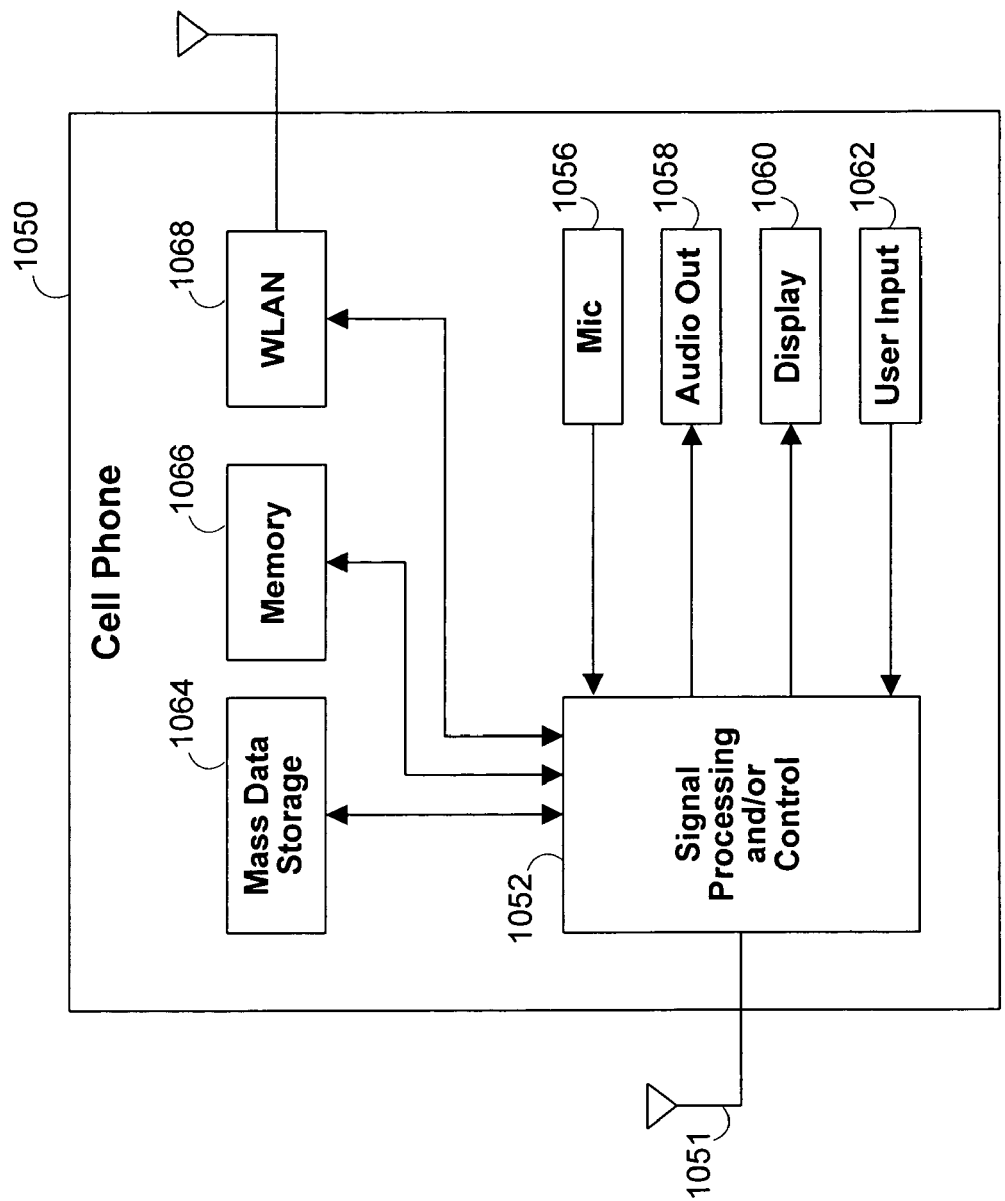
FIG. 5C is a block diagram of an exemplary cell phone that can employ the disclosed technology.

Referring now to FIG. 5C, the present invention can be implemented in a cellular phone 1050 that may include a cellular antenna 1051. The present invention may implement either or both signal processing and/or control circuits, which are generally identified in FIG. 5C at 1052, a WLAN interface and/or mass data storage of the cellular phone 1050. In some implementations, the cellular phone 1050 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular phone 1050 may process data, perform coding and/or encryption, perform calculations, format data and/or perform other cellular phone functions.

The cellular phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 1050 may be connected to memory 1066 such as RAM, ROM, low latency nonvolatile memory such as flash memory and/or other suitable electronic data storage. The cellular phone 1050 also may support connections with a WLAN via a WLAN network interface 1068.

Figure 5D:
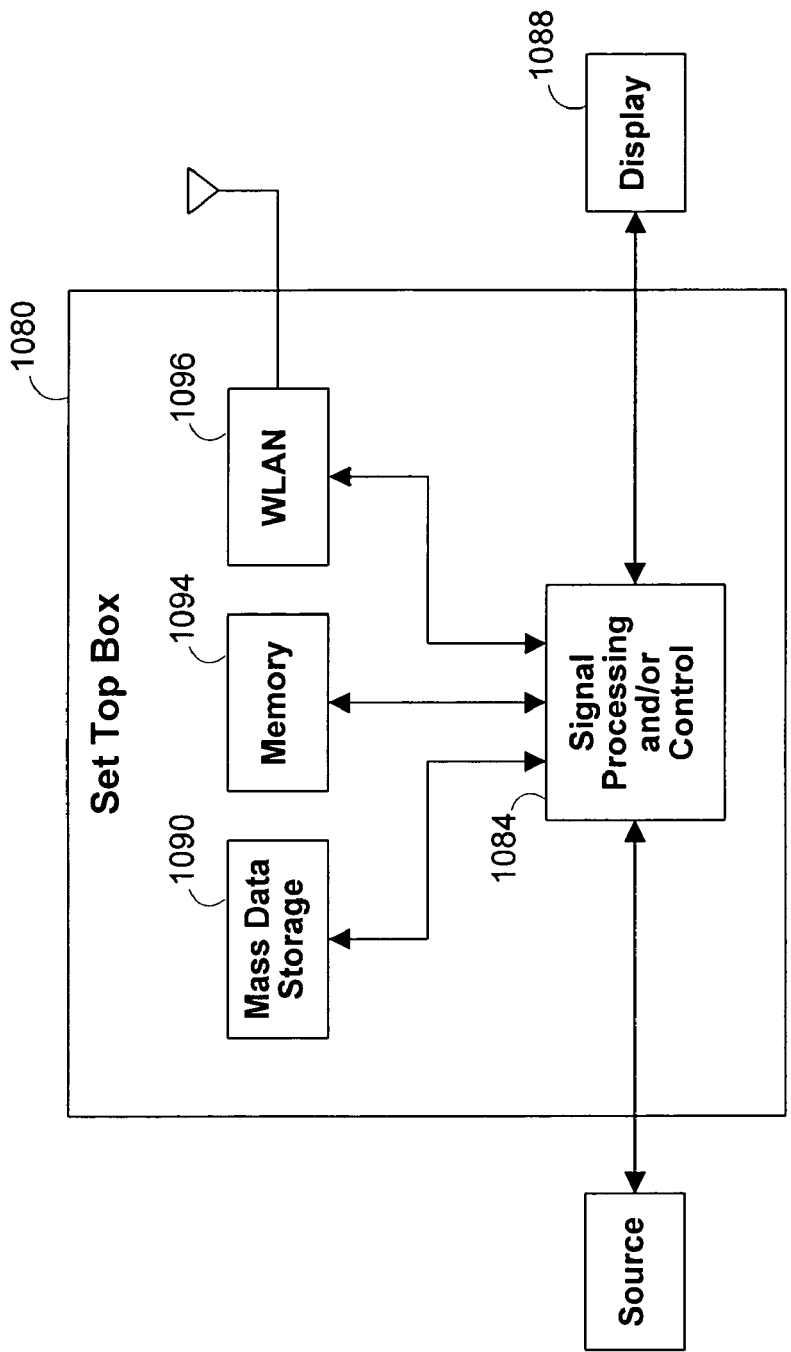
FIG. 5D is a block diagram of an exemplary set top box that can employ the disclosed technology.

Referring now to FIG. 5D, the present invention can be implemented in a set top box 1080. The present invention may implement either or both signal processing and/or control circuits, which are generally identified in FIG. 5D at 1084, a WLAN interface and/or mass data storage of the set top box 1080. The set top box 1080 receives signals from a source such as a broadband source and outputs standard and/or high definition audio/video signals suitable for a display 1088 such as a television and/or monitor and/or other video and/or audio output devices. The signal processing and/or control circuits 1084 and/or other circuits (not shown) of the set top box 1080 may process data, perform coding and/or encryption, perform calculations, format data and/or perform any other set top box function.

The set top box 1080 may communicate with mass data storage 1090 that stores data in a nonvolatile manner. The mass data storage 1090 may include optical and/or magnetic storage devices for example hard disk drives HDD and/or DVDs. The HDD may be a mini HDD that includes one or more platters having a diameter that is smaller than approximately 1.8". The set top box 1080 may be connected to memory 1094 such as RAM, ROM, low latency nonvolatile memory such as flash memory and/or other suitable electronic data storage. The set top box 1080 also may support connections with a WLAN via a WLAN network interface 1096.

Figure 5E:
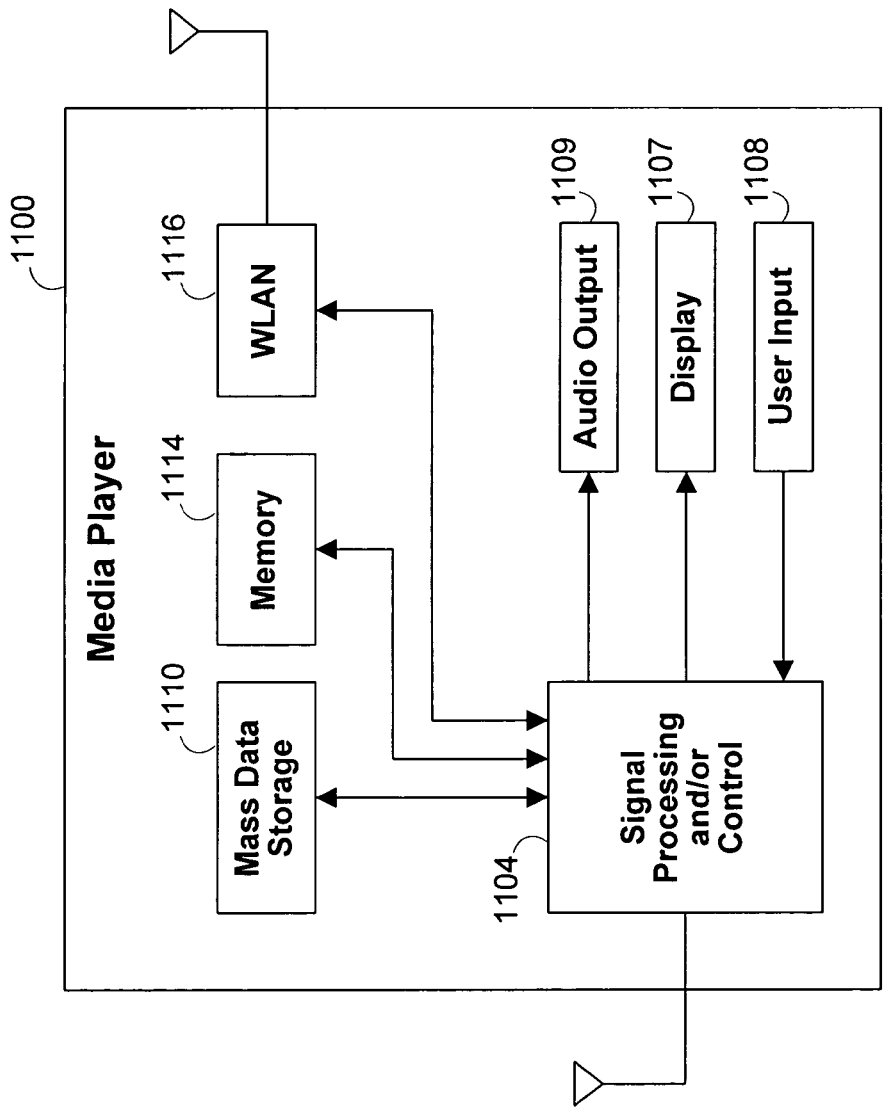
FIG. 5E is a block diagram of an exemplary media player that can employ the disclosed technology.

Referring now to FIG. 5E, the present invention can be implemented in a media player 1100. The present invention may implement either or both signal processing and/or control circuits, which are generally identified in FIG. 5E at 1104, a WLAN interface and/or mass data storage of the media player 1100. In some implementations, the media player 1100 includes a display 1107 and/or a user input 1108 such as a keypad, touchpad and the like. In some implementations, the media player 1100 may employ a graphical user interface (GUI) that typically employs menus, drop down menus, icons and/or a point-and-click interface via the display 1107 and/or user input 1108. The media player 1100 further includes an audio output 1109 such as a speaker and/or audio output jack. The signal processing and/or control circuits 1104 and/or other circuits (not shown) of the media player 1100 may process data, perform coding and/or encryption, perform calculations, format data and/or perform any other media player function.

The media player 1100 may communicate with mass data storage 1110 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 1100 may be connected to memory 1114 such as RAM, ROM, low latency nonvolatile memory such as flash memory and/or other suitable electronic data storage. The media player 1100 also may support connections with a WLAN via a WLAN network interface 1116. Still other implementations in addition to those described above are contemplated.

Accordingly, what have been described herein are a method and a system for communicating different versions of a communication signal in a diversity communication system. The disclosed methods, components, and circuits can be implemented using various analog and/or digital circuit means, including circuitry made from various types, sizes, and/or configurations of transistors, MOS transistors, field effect transistors, BJTs, diodes, resistors, capacitors, inductors, integrated circuits, operation amplifiers, operational transconductance amplifiers, comparators, registers, latches, and/or current sources. The disclosed methods and systems can also be implemented using a processor architecture having machine readable instructions. The disclosed embodiments and illustrations are exemplary and do not limit the scope of the disclosed invention as defined by the following claims.

What is claimed is:

1. A method for communicating a signal, the method comprising:
   accessing a phase shift estimate for a channel;
   computing a weight based on an inverse of the phase shift estimate and unity gain, wherein the weight is configured to affect phase of a signal without affecting gain of the signal;
   producing a weighted signal based on applying the weight to the signal, wherein a magnitude of the weighted signal is the same as a magnitude of the signal based on the unity gain; and
   communicating the weighted signal to the channel.

2. The method of claim 1, further comprising quantizing the phase shift estimate to a particular bit precision.

3. The method of claim 1, further comprising:
   accessing a phase shift factor; and
   computing the weight further based on the phase shift factor.

4. The method of claim 3, wherein the phase shift factor is a phase shift estimate for a second channel that is distinct from the channel.

5. The method of claim 1, further comprising:
   accessing a phase shift estimate for a second channel that is distinct from the channel;
   computing a second weight based on an inverse of the phase shift estimate for the second channel and based on unity gain;
   producing a second weighted signal based on applying the second weight to the signal, wherein a magnitude of the second weighted signal is the same as the magnitude of the signal based on the unity gain; and
   communicating the second weighted signal to the second channel.

6. The method of claim 5, further comprising:
   accessing a phase shift factor; and
   computing the weight and the second weight further based on the phase shift factor.

7. The method of claim 6, wherein the phase shift factor is the phase shift estimate for the channel.

8. The method of claim 7, wherein computing the weight further based on the phase shift factor includes setting the weight to a value of one.

9. A system for communicating signals, the system comprising:
   a channel estimation circuit that accesses a phase shift estimate for a channel;
   a diversity weighting circuit in communication with the channel estimation circuit, wherein the diversity weighting circuit includes:
      circuitry that computes a weight based on an inverse of the phase shift estimate and unity gain, wherein the weight is configured to affect phase of a signal without affecting gain of the signal, and
      circuitry that provides a weighted signal based on applying the weight to the signal, wherein a magnitude of the weighted signal is the same as a magnitude of the signal based on the unity gain; and
   a communication circuit in communication with the diversity weighting circuit, wherein the communication circuit communicates the weighted signal to the channel.

10. The system of claim 9, wherein the channel estimation circuit includes circuitry that quantizes the phase shift estimate to a particular bit precision.

11. The system of claim 9, wherein the diversity weighting circuit further comprises:
    circuitry that accesses a phase shift factor; and
    circuitry that computes the weight further based on the phase shift factor.

12. The system of claim 11, wherein the phase shift factor is a phase shift estimate for a second channel that is distinct from the channel.

13. The system of claim 9, further comprising:
    a second channel estimation circuit that accesses a phase shift estimate for a second channel that is distinct from the channel;
    a second diversity weighting circuit in communication with the second channel estimation circuit, wherein the second diversity weighting circuit includes:
       circuitry that computes a second weight based on an inverse of the phase shift estimate for the second channel and based on unity gain, and
       circuitry that provides a second weighted signal based on applying the second weight to the signal, wherein a magnitude of the second weighted signal is the same as a magnitude of the signal based on the unity gain; and
    a second communication circuit in communication with the second diversity weighting circuit, wherein the second communication circuit communicates the second weighted signal to the second channel.

14. The system of claim 13, wherein:
    the channel estimation circuit, the diversity weighting circuit, and the communication circuit are located at a first location; and
    the second channel estimation circuit, the second diversity weighting circuit, and the second communication circuit are located at a second location distinct from the first location.

15. The system of claim 13, wherein:
    the diversity weighting circuit further comprises:
       circuitry that accesses a phase shift factor, and
       circuitry that computes the weight further based on the phase shift factor; and
    the second diversity weighting circuit further comprises:
       circuitry that accesses the phase shift factor, and
       circuitry that computes the second weight further based on the phase shift factor.

16. The system of claim 15, wherein the phase shift factor is the phase shift estimate for the channel.

17. The system of claim 16, wherein the circuitry in the diversity weighting circuit that computes the weight further based on the phase shift factor is a circuit that sets the weight to a value of one.

18. A system for communicating a signal, the system comprising:
    means for accessing a phase shift estimate for a channel;
    means for computing a weight based on an inverse of the phase shift estimate and unity gain, wherein the weight is configured to affect phase of a signal without affecting gain of the signal;
    means for producing a weighted signal based on applying the weight to the signal, wherein a magnitude of the weighted signal is the same as a magnitude of the signal based on the unity gain; and
    means for communicating the weighted signal to the channel.

19. The system of claim 18, further comprising means for quantizing the phase shift estimate to a particular bit precision.

20. The system of claim 18, further comprising:

means for accessing a phase shift factor; and means for computing the weight further based on the phase shift factor.

21. The system of claim 20, wherein the phase shift factor is a phase shift estimate for a second channel that is distinct from the channel.

22. The system of claim 18, further comprising:

means for accessing a phase shift estimate for a second channel that is distinct from the channel;

means for computing a second weight based on an inverse of the phase shift estimate for the second channel and based on unity gain;

means for producing a second weighted signal based on applying the second weight to the signal, wherein a magnitude of the second weighted signal is the same as the magnitude of the signal based on the unity gain; and means for communicating the second weighted signal to the second channel.

23. The system of claim 22, further comprising:

means for accessing a phase shift factor;

means for computing the weight further based on the phase shift factor; and means for computing the second weight further based on the phase shift factor.

24. The system of claim 23, wherein the phase shift factor is the phase shift estimate for the channel.

25. The system of claim 24, wherein computing the weight further based on the phase shift factor includes setting the weight to a value of one.

* * * * *